(12) United States Patent
Liao et al.

(10) Patent No.: US 7,666,385 B2
(45) Date of Patent: Feb. 23, 2010

(54) NANOSTRUCTURED ZINC OXIDE PHOTOCATALYST FOR VISIBLE LIGHT AND MANUFACTURING METHOD OF THE SAME

(75) Inventors: Shih-Chieh Liao, Chungli (TW);
Song-Wein Hong, Erlin Township (TW);
Hsiu-Fen Lin, Taichung (TW)

(73) Assignee: Industrial Technology Research Institute, Hsinchu County (TW)

( * ) Notice: Subject to any disclaimer, the term of this patent is extended or adjusted under 35 U.S.C. 154(b) by 651 days.

(21) Appl. No.: 11/024,403

(22) Filed: Dec. 30, 2004

(65) Prior Publication Data

US 2005/0249660 A1 Nov. 10, 2005

(30) Foreign Application Priority Data

Feb. 20, 2004 (TW) .............................. 93104177 A

(51) Int. Cl.
*C01G 9/03* (2006.01)
(52) U.S. Cl. ....................................... 423/623
(58) Field of Classification Search ................. 423/622, 423/623
See application file for complete search history.

(56) References Cited

U.S. PATENT DOCUMENTS 4,610,857 A * 9/1986 Ogawa et al. ............... 423/335

2002/0139688 A1* 10/2002 Okura et al. ................. 205/333

FOREIGN PATENT DOCUMENTS

| JP | 09192496 | | 7/1997 |
|---|---|---|---|
| JP | 09262482 | | 7/1997 |
| JP | 11290697 | A | 10/1999 |
| JP | 2000103647 | A | 4/2000 |
| JP | 2001205094 | A | 7/2001 |
| JP | 2001212457 | A | 8/2001 |
| WO | WO 99/60994 | * | 12/1999 |

* cited by examiner

*Primary Examiner*—Stanley Silverman
*Assistant Examiner*—James Fiorito
(74) *Attorney, Agent, or Firm*—Lowe Hauptman Ham & Berner, LLP

(57) ABSTRACT

A powdered photocatalyst and manufacturing method thereof are disclosed. The manufacturing method of the photocatalytic nanopowders is achieved by the non-transferred DC plasma apparatus in an atmosphere of nitrogen at around 1 atm. The nitrogen-containing gas is used as the plasma-forming gas. After the generation of the nitrogen-plasma in the non-transferred DC plasma apparatus, a plurality of solid Zn precursors are introduced to the nitrogen-plasma for vaporization and oxidization. The solid Zn precursors are vaporized and oxidized through homogeneous nucleation and are rapidly cooled down by a large amount of cooling gas (i.e. mixture of nitrogen and oxygen). After the cooling process, the tetrapod-shaped and nitrogen-doped photocatalytic ZnO nanopowders having wurtzite structure are formed.

9 Claims, 4 Drawing Sheets

NANOSTRUCTURED ZINC OXIDE PHOTOCATALYST FOR VISIBLE LIGHT AND MANUFACTURING METHOD OF THE SAME

BACKGROUND OF THE INVENTION

1. Field of the Invention

The present invention relates to a powdered photocatalyst and its manufacturing method and, more particularly, to nanopowders of the ZnO photocatalyst activated by UV or visible light and its manufacturing method.

2. Description of Related Art

Photocatalysts such as ZnO and $TiO_2$ nano-particles have drawn much attention due to their applications in antibacterials, water treatment, deodorants, NOX decomposition, self-cleaning and so on. Conduction-band electrons and valence-band holes are generated on its surface when a photocatalyst is illuminated by light with energy greater than its band gap energy. Holes can then react with water molecules adhering to the surface of the photocatalyst to form highly reactive hydroxyl radicals (OH.). Oxygen here acts as an electron acceptor by forming a super-oxide radical anion ($O_2^-$.) on the surface. The super-oxide radical anions may act as oxidizing agents or as an additional source of hydroxyl radicals via the subsequent formation of hydrogen peroxide. The powerful oxidants associated with hydroxyl radicals are able to oxidize organic materials. When the cell membrane of bacteria is in contact with the powerful oxidants, it will be decomposed and consequently the bacteria will die. The body of the bacteria will eventually be decomposed into carbon dioxide and water. Photocatalysts not only kill the bacteria, but also clean their bodies. Therefore, the objective for cleaning and sterilization can be easily achieved by the assistance of photocatalyst.

In addition, the exposure of the photocatalyst to the light radiation can also increase the hydrophility of the photocatalyst by forcing the adsorbed water to penetrate into the interfaces between the pollutant and the photocatalyst. Owing to the increased hydrophile, the pollutants adhering to the surface can be easily removed through washing. Therefore, the self-cleaning advantage of the photocatalyst can be applied to, for example, streetlamp covers and outdoor walls/windows, for keeping their cleanliness for a long time.

Because of its band-gap energy of 3.2 eV, ZnO absorbs UV light with the wavelength equal to or less than 385 nm. It is known that visible light (wavelength between 400 and 700 nm) accounts for 45% of energy in the solar radiation while in UV light it is less than 10%. Even in the radiation of the cold cathode fluorescence lamp, illuminance of only 0.1 $mW/cm^2$ is in the near-UV band. Since the illuminance is reversely proportion to the square of the distance from the light source, the illuminance for most objects in a room is only around 0.1 $\mu W/cm^2$. Under regular indoor illuminance, it is very hard to activate the photocatalyst for reaction effectively. Therefore, as far as photocatalytic efficiency or indoor applications are concerned, it is desirable that photocatalyst such as ZnO can absorb not only UV but also visible light.

Since the high surface area and the special structure of nanopowders (with an average diameter less than 100 nm), they have special magnetic, dielectric, optical, and thermal properties. For increasing the surface area and thus the effective reaction area of a photocatalyst, most manufacturing make considerable efforts to reduce the size of the particles. For conventional photocatalyst powders (with an average particle size greater than 100 nm), the electrons and holes will be relatively easy to recombine during the transportation in the particles. Moreover, the surface area of conventional photocatalysts is low. These two effects reduce the activity of photocatalysis. Generally, the size of nanoparticles (or nanopowders) greatly depends on the manufacturing methods. Furthermore, the material itself and its structure also determine the properties of the photocatalysts. Therefore, the method for manufacturing a photocatalyst in a nanometer scale for visible light is the key factor for commercial applications in the future.

In the past time, a sputtering method for manufacturing photocatalysts for visible light was found in the disclosure of JP 2001-205094. The photocatalyst film is made by sputtering a target of $SnO_2$ and ZnO to a substrate in an atmosphere of nitrogen in the cited patent. Another patent, JP 11-290697 disclosed a method for manufacturing visible light $TiO_2$ photocatalyst through sol-gels doped with transition metal elements. Since further purification for removing contaminated cations from the mixtures of the starting materials such as metal alkoxide and metal inorganic salt is required, the microstructure, physical properties, and chemical properties of the final product are various.

Another method for manufacturing photocatalyst for visible light is disclosed in JP 09-192496, wherein a photocatalyst is made up of at least one oxide selected from titanium dioxide, zinc oxide, and tungsten oxide, $SrTiO_3$, or SiC, and doped with at least one transition metal element selected from the group consisting of V, Cr, Mg, Fe, Co, Ni, and Cu. The amount of these dopants is controlled in the range from 500 ppb to 500 ppm. The JP 09-262482 reports implanting at least one element into the surface of $TiO_2$ makes a photocatalyst for visible light. The elements for doping are selected from a group consisting of Cr, V, Cu, Fe, Mg, Ag, Pd, Ni, Mn and Pt. The concentration of the implanted ion is $\geq 1*10^{15}$ ions/g and the accelerating voltage is $\geq 30$ Kev. In addition to implanting metal elements to the surface of $TiO_2$, methods for implanting hydrogen or alkaline metal ions to the surface (e.g. JP 2000-103647) or for treating in hydrogen plasma or plasma of other rare gases are also reported (e.g. JP 2001-212457).

In addition, a method for forming photocatalyst TiC on the surface of $TiO_2$ by treating $TiO_2$ in the plasma of a mixture of gaseous methane and hydrogen is reported in U.S. Pat. No. 6,306,343.

SUMMARY OF THE INVENTION

The object of the present invention is to provide photocatalytic ZnO nanopowders that can be activated by UV or visible light.

The photocatalytic ZnO nanopowders of the present invention are visible-activated catalyst nanopowders made by doping a nitrogen element. The photocatalytic ZnO nanopowders of the present invention have a structure of wurtzite and are in a shape of ball, rod, or tetrapod. Among them, the photocatalytic ZnO nanopowders of the present invention in a shape of tetrapod have better photocatalytic activity.

Another object of the present invention is to provide a method for manufacturing or mass-producing nanopowders of the ZnO photocatalyst activated by either UV or visible light.

The method of the present invention is achieved by providing enough electric energy to the non-transferred DC plasma apparatus first. In the method for manufacturing oxide nanopowders of the present invention, plasma is generated by providing enough electric energy to the non-transferred DC plasma apparatus. Subsequently, the solid precursors are vaporized and oxidized by delivering them to the plasma continuously. Then the oxide powders in a nanometer scale can form continuously. In the method illustrated above, the disadvantage that occurs in the conventional art such as necessity of supplying/replacing electrodes in time can be avoided.

In the method of the present invention for manufacturing photocatalytic ZnO nanopowders, an arc is generated by supplying enough direct current to the non-transferred DC plasma apparatus first. Then the plasma-forming gas containing nitrogen is introduced to the arc to form the nitrogen-plasma. Then a highly pure Zn metal wire with a diameter in the millimeter scale or metal powders in the micrometer scale is then introduced to the plasma for vaporization and oxidation by a carrier gas containing nitrogen. The Zn metal wire or metal powders are vaporized in the nitrogen-plasma. Subsequently, the Zn metal vapors are rapidly cooled by a large amount of air. During the step of cooling, the vaporized metal vapors react with oxygen in the air to form nanopowders of UV-activated or visible-light-activated ZnO photocatalyst.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
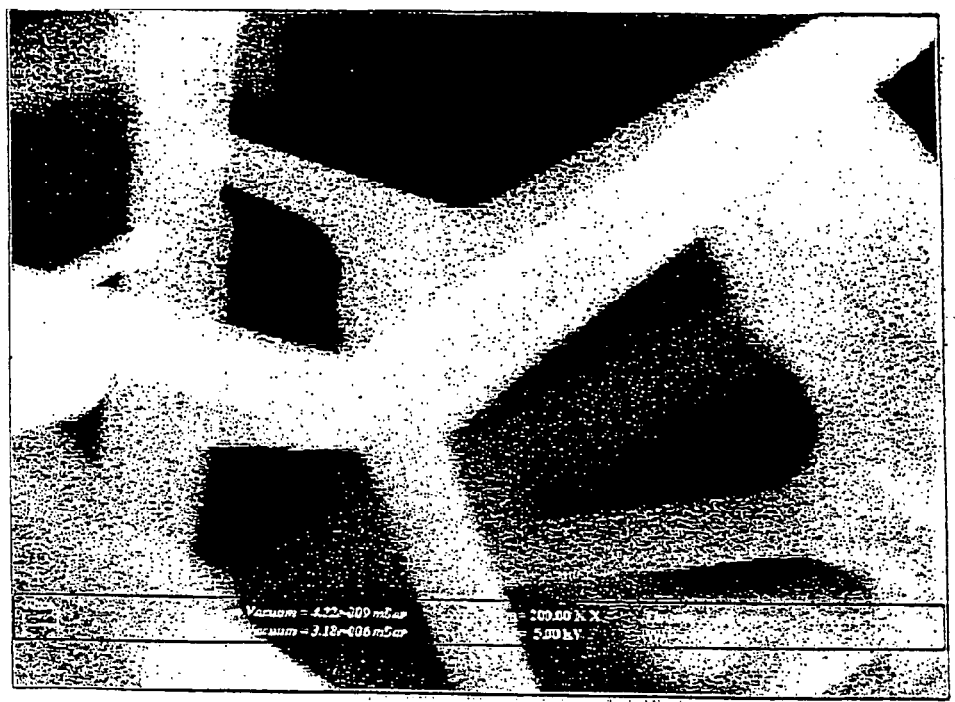
FIG. 1 is an EM photograph of the photocatalytic ZnO nanopowders made through the method of the present invention.

The method for manufacturing photocatalytic ZnO nanopowders is achieved by the non-transferred DC plasma apparatus in an atmosphere of nitrogen at around 1 atm. The non-transferred DC plasma is used for providing enough energy for reaction. The method of the present invention is performed through the following steps. First, a non-transferred DC plasma apparatus is provided.

Then nitrogen-containing gas is used for the plasma-forming gas.

After the nitrogen-plasma is generated, a solid Zn precursor is introduced to the plasma for vaporization and oxidization.

The vaporized and oxidized solid Zn precursors are rapidly cooled down by a large amount of cooling gas. Subsequently, the photocatalytic ZnO nanopowders are formed and their size and property are adjustable by controlling the flow rate and species of the cooling-gas.

The nitrogen-plasma used here is generated by supplying a direct current to the non-transferred electrodes (a cathode and an anode) in the presence of nitrogen plasma-forming gas. In addition to nitrogen, the mixture of argon and nitrogen can be alternative for the plasma-forming gas.

The solid precursor used here is preferred to be zinc wires with a millimeter-scaled diameter, micrometer-scaled zinc powders, or micrometer-scaled zinc oxide powders. In the present embodiment, the solid precursor illustrated above is introduced to the nitrogen-plasma through a pipe by the assistance of a carrier gas. The carrier gas can be air or nitrogen. In the present invention, nitrogen is the key dopant for the final product photocatalytic ZnO nanopowders.

The cooling-gas used here is air. In fact, adjusting the flow rate of the cooling-gas can control the growth rate of the photocatalytic ZnO nanopowders.

Here following is an embodiment of the method for manufacturing photocatalytic ZnO nanopowders of the present invention.

In the present embodiment, three sets of the non-transferred electrodes (a cathode and an anode) are supplied with a direct current ranging from 170 to 250 A (440 volt) to generate an arc. The plasma-forming gas containing nitrogen is introduced to pass through the arc in a flow rate of 150 slm to form nitrogen-plasma (70 kW). The solid precursor of micrometer-scaled zinc powders is introduced to the nitrogen-plasma through a carrier gas (i.e. air or nitrogen) for vaporization and oxidation. The feeding rate of the micrometer-scaled zinc powder is 0.5-2.0 kg and the flow rate of the carrier gas is 10 slm.

The pressure of the nitrogen-containing atmosphere is controlled at around 1 bar. The vaporized and oxidized zinc powders are then quenched by a large amount of cooling gas (i.e. mixture of nitrogen and oxygen) to form photocatalytic ZnO nanopowders through homogeneous nucleation under this condition.

In the present embodiment, the typical flow rate of the cooling gas is 3500 slm. The overall time for the reaction (i.e. vaporization, oxidation and quenching processes) is controlled within a time period of $10^{-2}$-$10^{-1}$ second.

Particle size and morphology of the photocatalytic ZnO nanopowders with wurtzite structure can be controlled by the related parameters such as the reaction time, the flow rate and species of the plasma-forming gas, the plasma power, and the flow rate and species of the cooling-gas. The morphology of the manufactured nanopowders of ZnO photocatalyst includes ball, rod and tetrapod. The photocatalytic ZnO nanopowders contain nitrogen (ranging from 1 ppm to several thousand ppm), and at least one metal element (ranging from 1 ppm to several thousand ppm) selected from the group consisting of Fe, Cr, and Pb.

Figure 2:
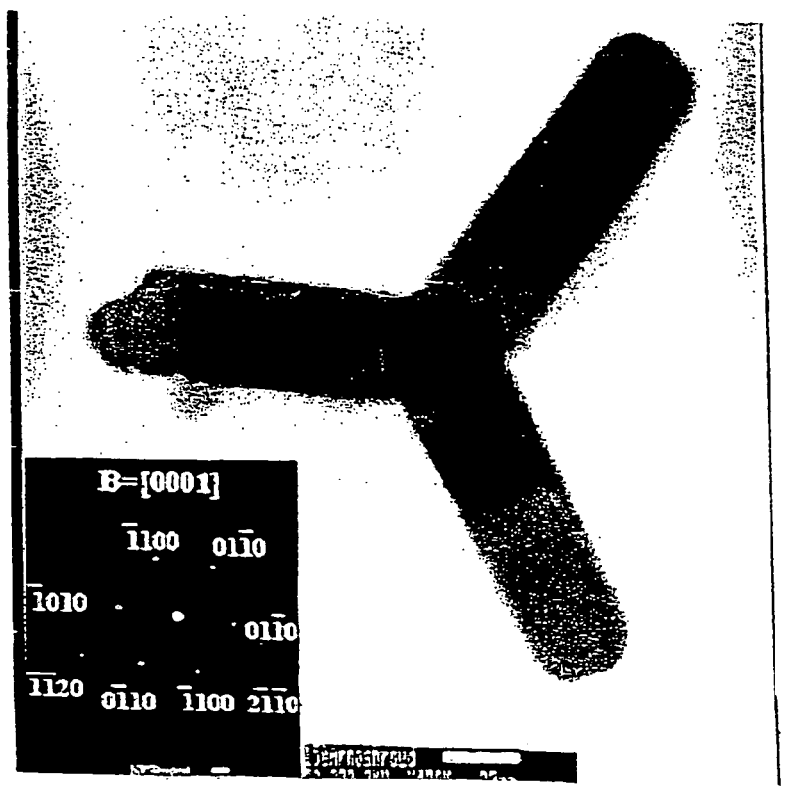
FIG. 2 is an EM photograph of the photocatalytic ZnO nanopowders in a shape of tetrapod made through the method of the present invention.

An EM photograph of the photocatalytic ZnO nanopowders made through the method of the present invention can be found in FIG. 1. The photocatalytic ZnO nanopowders shown in FIG. 1 are in a shape of tetrapod; wherein each crystalline rod of the tetrapod has a cross-section of hexagon. Moreover, each rod of the photocatalytic ZnO nanopowders grows along a direction of [0001] and has a diameter less than 100 nm (the average diameter is about 25 nm, see FIG. 2).

Figure 3:
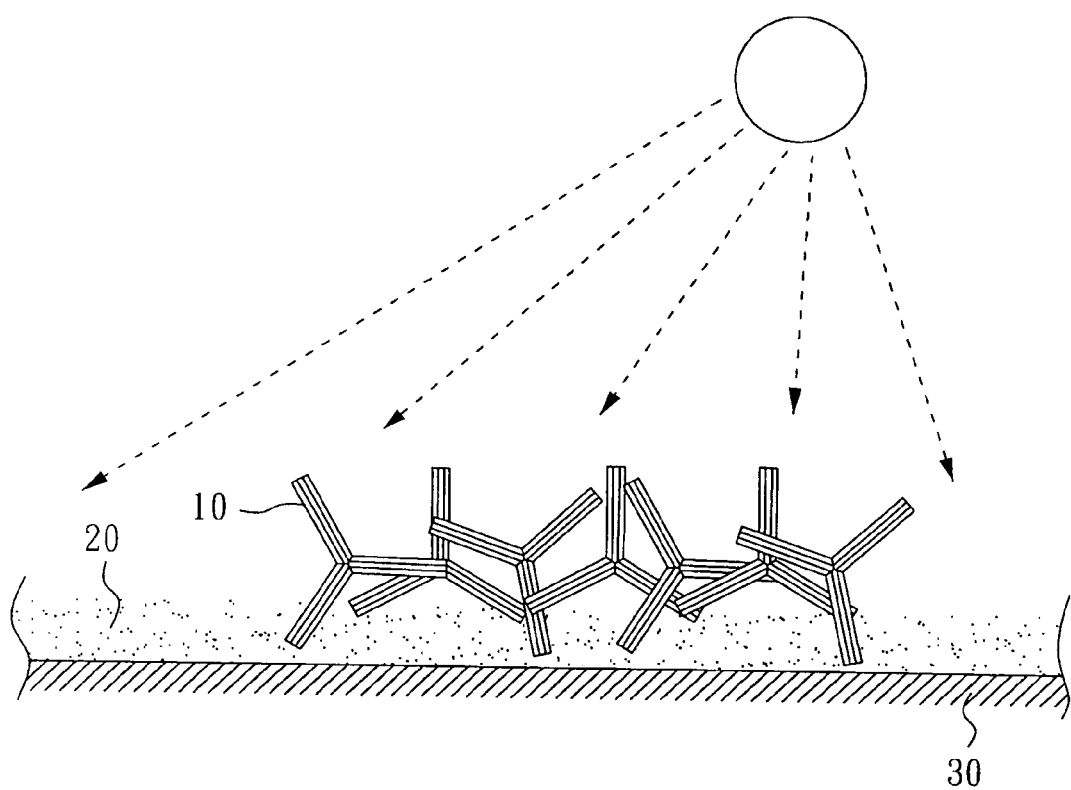
FIG. 3 is a schematic view showing the photocatalytic ZnO nanopowders in a shape of tetrapod sprayed on the surface of a substrate.

Among the nanopowders produced through the method of the present invention, the photocatalytic ZnO nanopowders in a shape of tetrapod (see FIG. 3) have better photocatalytic effect. As illustrated above, the average diameter of each rod of the tetrapod-like ZnO nanopowders is about 25 nm. The photocatalytic ZnO nanopowders in the tetrapod shape can stand up and attach to the surface 30 by the assistance of binder 20 (see FIG. 3). Hence, ideally at least one of the four crystalline rods of the tetrapod-like ZnO nanopowders can protrude to perform photocatalysis. In other words, the photocatalytic efficiency of the tetrapod-like photocatalytic ZnO nanopowders is better than that of the photocatalytic ZnO nanopowders in a conventional ball shape, which can be seen in FIG. 5.

Figure 4:
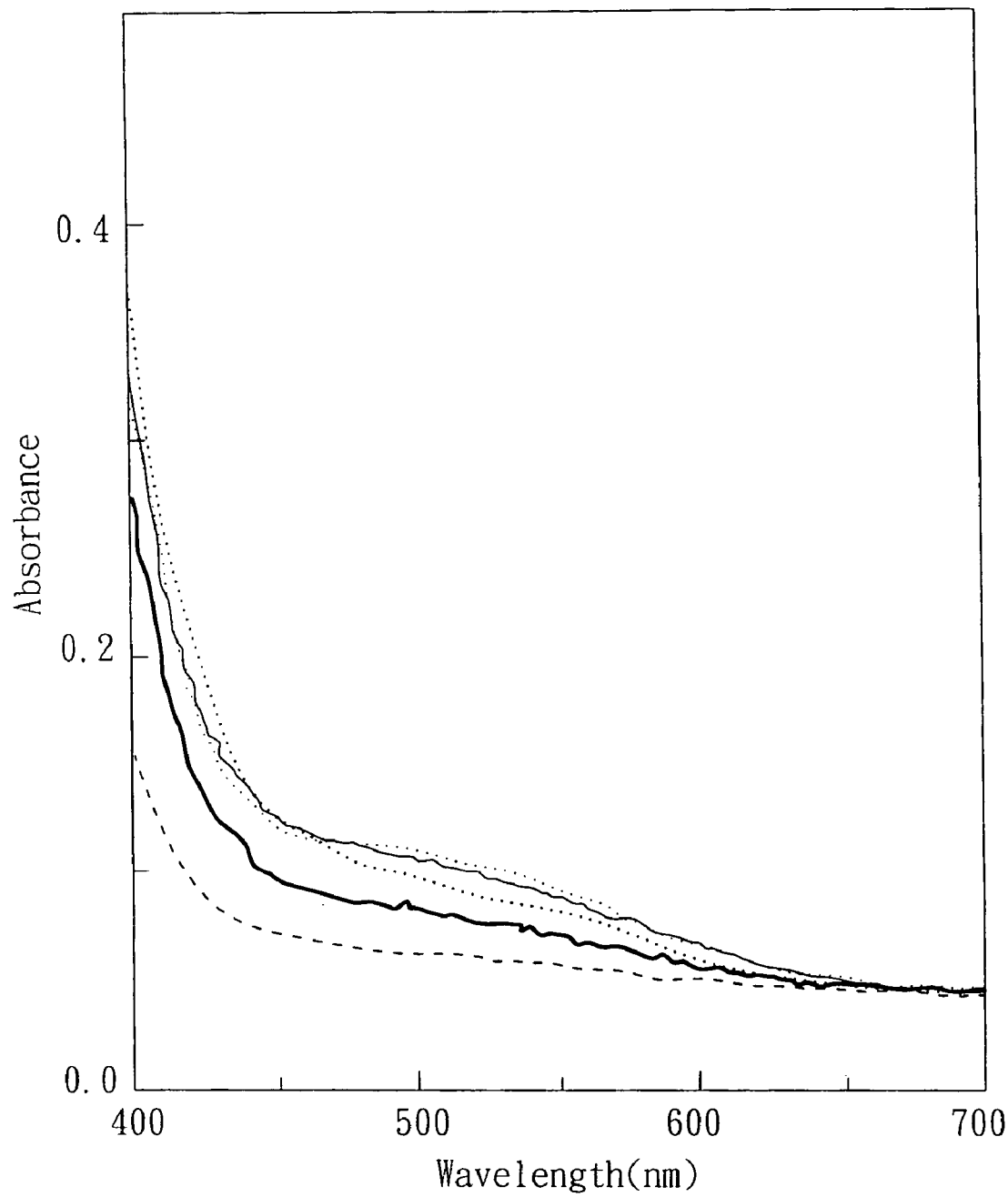
FIG. 4 is a diagram showing the relationship of the light absorbance as a function of the wavelength for the photocatalytic ZnO nanopowders made through the method of the present invention.

The relationship of the light absorbance as a function of the wavelength for the photocatalytic ZnO nanopowders made through the method of the present invention can be seen in FIG. 4 where significant absorption is observed in the visible light band of 400-650 nm.

Figure 5:
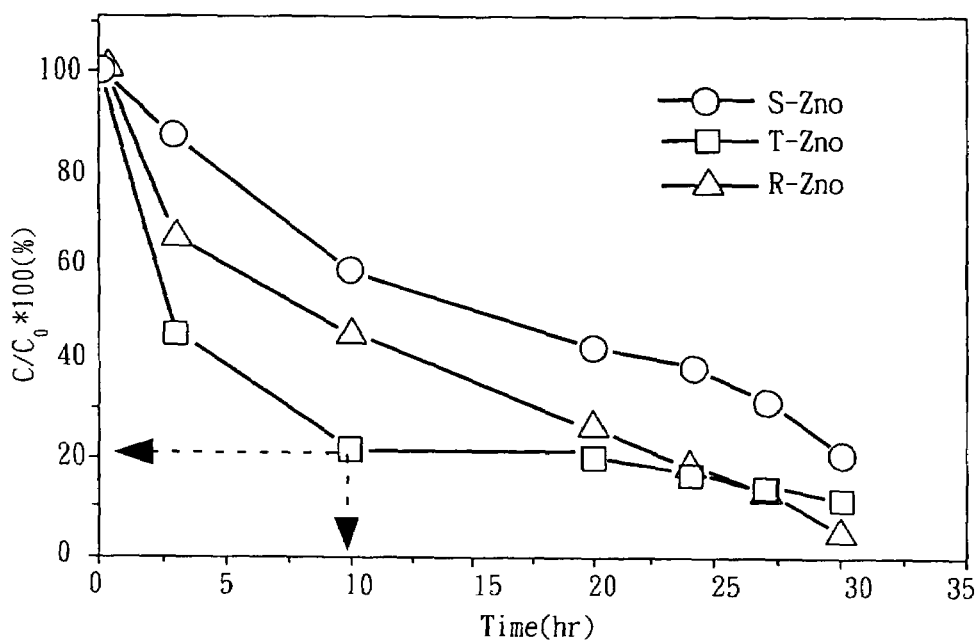
FIG. 5 is a diagram showing the decomposition of the methylene blue solution under the visible light irradiation as a function of time for the photocatalytic ZnO nanopowders made through the method of the present invention.

Results of the decomposition of the methylene blue solution under the visible light irradiation as a function of time for the photocatalytic ZnO nanopowders of the present invention is shown in FIG. 5. The test is performed by exposing the methylene blue solution ($10^{-5}$ M) containing 0.2 wt. % of the spherical, rod- and tetrapod-like ZnO nanopowders of the present invention to the visible light with a wavelength of 543 nm and an intensity of 7000 Lux first. Then the concentration of the methylene blue in the solution at different times is recorded. As shown in FIG. 5, the concentration of methylene blue solution containing the tetrapod-like ZnO nanopowders decreases to 20% or less after the exposure for 10 hours.

Figure 6:
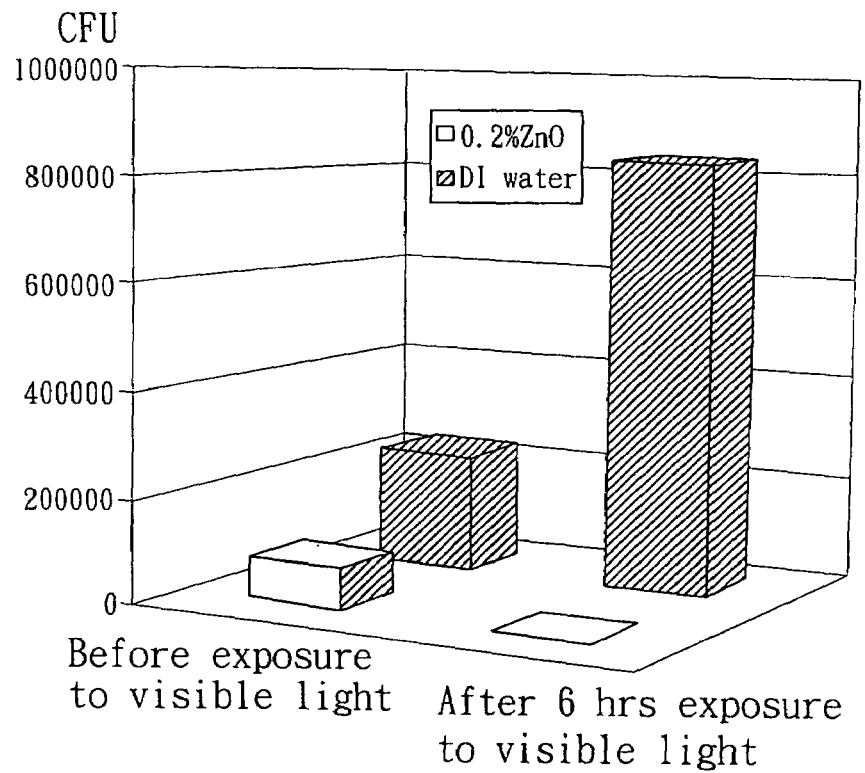
FIG. 6 is a diagram showing the results of anti-microbial tests for the photocatalytic ZnO nanopowders made through the method of the present invention.

Results of the anti-microbial test under the visible light irradiation for the photocatalytic ZnO nanopowders of the present invention are shown in FIG. 6. The intensity and wavelength of the visible light used in the present test are 1500 Lux and 543 nm, respectively. Compared with that of the anti-microbial test performed with deionized water, the photocatalytic ZnO nanopowders of the present invention under the visible light irradiation show a better anti-microbial effect.

Although the present invention has been explained in relation to its preferred embodiment, it is to be understood that many other possible modifications and variations can be made without departing from the spirit and scope of the invention as hereinafter claimed.

What is claimed is:

1. A method for manufacturing photocatalytic ZnO nanopowders, comprising the following steps:

generating a nitrogen-plasma;

introducing a solid precursor of zinc metal in the form of wire or powders to the plasma continuously for vaporization and oxidation; and obtaining photocatalytic ZnO nanopowders by quenching the plasma containing the vaporized and oxidized precursor through a cooling-gas;

wherein the nitrogen plasma is generated by introducing a direct current to one to three sets of electrodes in the presence of nitrogen gas, each set of electrodes comprising a cathode and an anode.

2. The method as claimed in claim 1, wherein the plasma-forming gas further comprises argon.

3. The method as claimed in claim 1, wherein the flow rate of the plasma-forming gas is equal to or greater than 150 slm, wherein the cooling-gas is a mixture of nitrogen and oxygen, and wherein the flow rate of the cooling-gas is about 3500 slm.

4. The method as claimed in claim 1, wherein the feeding rate of the solid precursor of zinc ranges from 0.5 to 2.0 Kg/hour.

5. The method as claimed in claim 1, wherein the solid precursor is selected from a group consisting of zinc wires with a millimeter-scaled diameter, micrometer-scaled zinc powders, and micrometer-scaled zinc oxide powders.

6. The method as claimed in claim 5, wherein the solid precursor of zinc is introduced to the nitrogen-plasma by a carrier gas.

7. The method as claimed in claim 6, wherein the carrier gas is air or nitrogen.

8. The method as claimed in claim 6, wherein the typical flow rate of the carrier gas is 10 slm.

9. The method as claimed in claim 1, wherein the pressure of the nitrogen-containing atmosphere is controlled at around 1 bar.

* * * * *